United States Patent [19]
Arnell et al.

[11] Patent Number: 5,727,348
[45] Date of Patent: Mar. 17, 1998

[54] PORTABLE REMOTE CONTROLLED DOOR CLOSER

[76] Inventors: Louis G. Arnell, 3008 Caminito Niquel, San Diego, Calif. 92117; Leon Arnell, 1 Barbara La., Monsey, N.Y. 10952; Thomas P. Sturges, 2505 Crest Dr., Manhattan Beach, Calif. 90266

[21] Appl. No.: 654,042

[22] Filed: May 28, 1996

Related U.S. Application Data

[60] Provisional application No. 60/006,252, Nov. 7, 1995.

[51] Int. Cl.⁶ .................................................. E05F 15/20
[52] U.S. Cl. .................................. 49/25; 49/340; 49/324
[58] Field of Search .......................... 89/324, 339, 340, 89/29, 25

[56] References Cited

U.S. PATENT DOCUMENTS

| | | |
|---|---|---|
| 2,651,074 | 9/1953 | Slopa et al. . |
| 2,946,081 | 7/1960 | Juergens . |
| 2,959,806 | 11/1960 | Stewart . |
| 4,330,958 | 5/1982 | Richmond ............... 49/340 X |
| 4,348,835 | 9/1982 | Jones et al. ............. 49/340 X |
| 4,429,490 | 2/1984 | Zunkel . |
| 4,503,723 | 3/1985 | Reid .................. 49/339 X |
| 4,660,324 | 4/1987 | Nyenbrink . |
| 4,782,628 | 11/1988 | Gaddis . |
| 4,970,826 | 11/1990 | Richmond et al. . |
| 5,018,304 | 5/1991 | Longoria .................. 49/340 |
| 5,040,331 | 8/1991 | Merendino et al. . |
| 5,094,499 | 3/1992 | Simone, Jr. . |
| 5,299,386 | 4/1994 | Naegelli et al. . |
| 5,392,562 | 2/1995 | Carámbula . |

*Primary Examiner*—Jerry Redman
*Attorney, Agent, or Firm*—Harris F. Brotman

[57] ABSTRACT

A portable remotely controlled automatic door closing apparatus enables the door of a room or office to be closed from a remote location within the room or office by transmitting a signal to an actuator which exerts a force on the door to move it from an opened position to a closed position. The apparatus comprises a battery or AC powered motor which moves a lever arm into engagement with the door to rotate the door about its hinges from the open to the closed position. The apparatus is free standing and immobilized on the floor in a non-connected relationship thereto between an adjacent wall and the door in its open position. The apparatus is immobilized to prevent slipping by a floor-engaging mechanism, such as an adhesive, an anti-skid rubber material, or suction cups, or carpet engaging projections.

19 Claims, 6 Drawing Sheets

| FIG. 2A |
|---------|
| FIG. 2B |

FIG. 6

PORTABLE REMOTE CONTROLLED DOOR CLOSER

CROSS-REFERENCE TO RELATED APPLICATIONS

This application is related to prior provisional application Ser. No. 60/006,252, filed Nov. 7, 1995.

BACKGROUND OF THE INVENTION

This invention relates generally to apparatus for automatically closing of a door, and in particular to apparatus which is portable and which permits a user to selectively close a door from a remote location in a room such as an office.

Devices for automatically opening and closing a door are well known. Most commonly, they include an actuator such as a switch secured to a structure surrounding the door or a sensor as in the floor or over the door to detect the presence of a person approaching the door. The actuator may control an electrical motor and mechanical drive mechanism, such as a radius arm that extends out over the door to transmit an opening and closing force to the door. In other cases, doors which are biased to a closed position as by a spring or pneumatic device may be held opened by a magnetic latch which can be remotely deactivated to allow the door to close.

All of these known operating devices require that a drive mechanism for operating the door be physically attached to the door and to an adjacent structure, such as the wall or door frame. Once installed, they are not intended to be moved to different locations, and typically require extensive modifications to a door or to its frame or adjacent walls in order to be later added or removed.

There are a number of situations where remotely controlled automatic door closers are desirable. For example, in an office environment, a professional may need to close his or her office door for privacy or to reduce noise from outside without disrupting his or her conversation, meeting or work to get up, walk to the door, and physically close it. While there are devices which will allow the occupant to close a door from a remote location within a room, they have not found wide applicability. For example, U.S. Pat. No. 5,040,331 to Merendino et al. discloses a remotely controlled door opening and closing device which may be operated from a remote location. However, this device and all other similar known devices suffer from the disadvantages of complicated construction and the necessity of being physically attached to the door and surrounding structure. In a commercial office building where office space is leased, it is not cost effective or practical for a landlord to provide such devices, and it may be too expensive and impractical for a tenant to add or remove them subsequently, especially where occupants of offices may be subject to change.

It is desirable to provide automatic door closing apparatus which avoids the foregoing and other disadvantages of known devices, and which enables an occupant in a room to close a door automatically from a remote location in the room, and to easily move the apparatus to different rooms. It is to these ends the present invention is directed.

SUMMARY OF THE INVENTION

The invention addresses the foregoing and other problems and disadvantages of known door closing devices by providing a door closing apparatus which can be remotely operated and which does not require physical attachment either to the door or to its surrounding structure, thereby enabling the apparatus to be easily relocated. The invention, therefore, conveniently enables offices or other rooms to be personalized to the occupant, and its portability facilitates movement to different locations with such occupant. Moreover, apparatus in accordance with the invention is relatively uncomplicated, low cost, and satisfies a need which might otherwise be incapable of satisfaction because of either the inability or impracticality of attaching known door closing devices to structures.

The invention achieves these foregoing advantages by providing a remotely controlled door closing apparatus that includes means for exerting a force against the door to move the door from an opened to a closed position, and control means for receiving a remote actuating signal and for operating the force exerting means in response to move the door to the closed position. The apparatus includes a free-standing housing adapted to be positioned on a floor adjacent to the open position of the door, and includes means for immobilizing the housing to prevent movement during operation of the apparatus.

In accordance with more specific aspects of the invention, the apparatus employs a reversible motor which, upon receiving an actuating signal from a user, is driven by a timing circuit for a predetermined period of time to cause a door engaging arm to move the door from its opened position to its closed position. Thereafter, the motor reverses to return to its initial position. The invention may use an infra-red (IR) control unit and detector, or it may use some other form of wireless signal generating and receiving means, e.g., radio frequency, for providing an actuating signal for actuating the motor. The apparatus may further include a slip clutch mechanism for coupling the arm to the motor. As the motor is actuated, the arm engages the door and exerts a force against it to close it. The slip clutch mechanism allows the arm to slip relative to the motor shaft if it encounters a reverse force of a predetermined amount, and prevents damage to the apparatus if the door encounters an obstacle which prevents it from closing, or if somebody tries to push the door open while it is being closed by the apparatus.

Other features and advantages of the invention will become apparent from the description which follows.

BRIEF DESCRIPTION OF THE DRAWINGS

FIG. 2, comprising FIGS. 2A and 2B, are more detailed schematic circuit diagram of the apparatus in FIG. 1;

DESCRIPTION OF PREFERRED EMBODIMENTS

Figure 1:
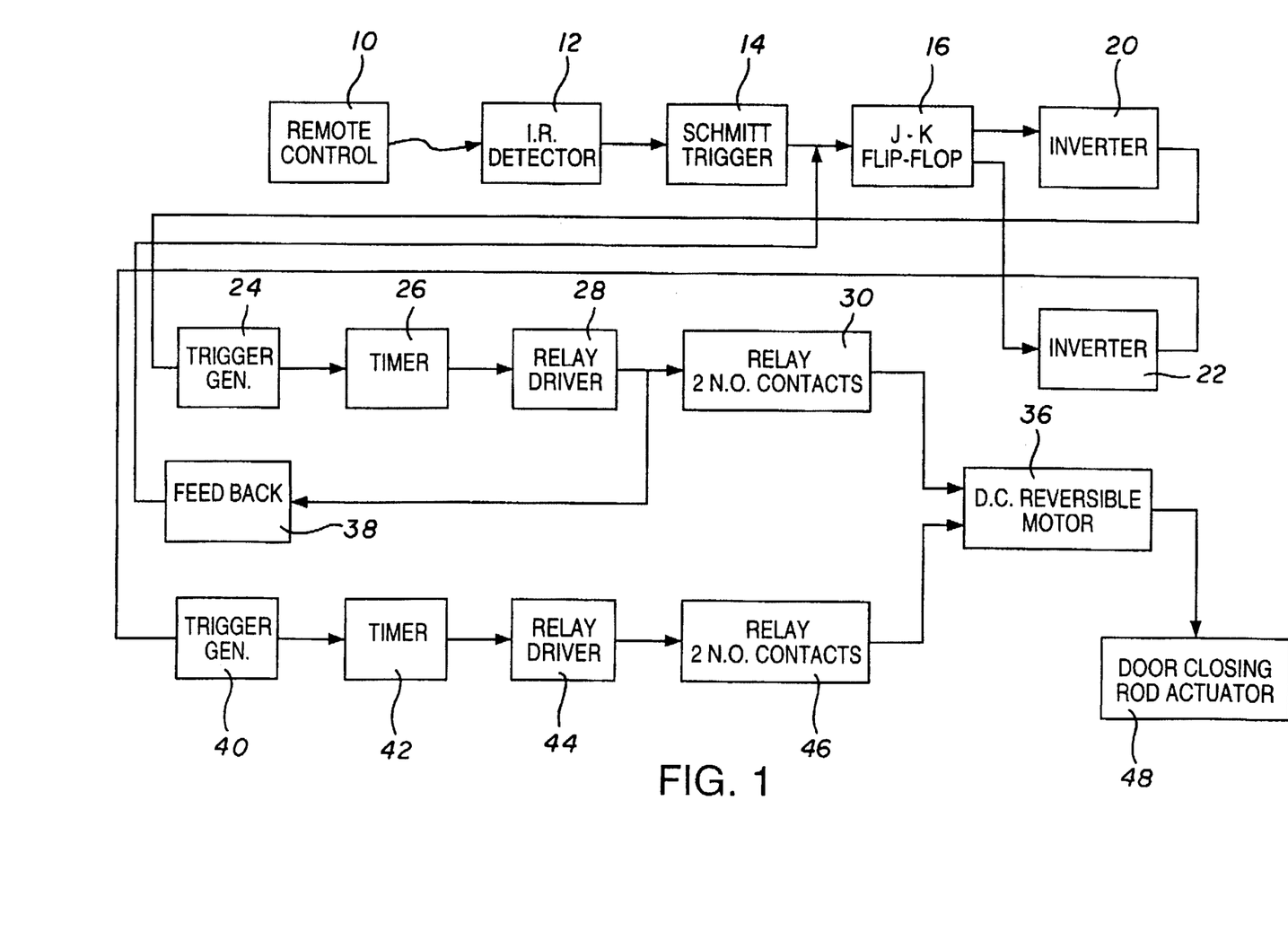
FIG. 1 is a block diagram of a remote controlled door apparatus in accordance with the invention.

FIG. 1 is a simplified block diagram illustrating the principal parts of remotely controlled door closing apparatus in accordance with the invention. As shown, the apparatus may comprise a remote control unit 10 which enables a user to generate and transmit a wireless actuation signal from a remote location to the apparatus to cause the apparatus to close a door with which it is associated. In a preferred form, the remote controlled unit 10 may comprise an infra-red (IR) emitter similar to that which is conventionally employed for controlling electronic equipment such as televisions and VCRs. It could also comprise some other radio signal generated means, such as conventionally employed with garage door openers and the like. The signal generated by the control unit is transmitted to and detected by an infra-red detector 12 which amplifies the signal and supplies it to a Schmitt trigger 14. The Schmitt trigger enables a J-K bistable flip-flop 16, the normal and inverted outputs of which are supplied to respective inverter circuits 20 and 22. Inverter 20 drives a trigger generator 24 and a timer 26 which outputs a drive signal having a predetermined time period, as it will be described shortly, to a relay driver 28. The relay driver 28, in turn, actuates a relay 30 which supplies power for the predetermined time interval established by the timer 26 to actuator means which may include a reversible motor 36 and a door closing rod actuator 48. This causes the motor to operate in a predetermined direction, to drive the force exerting door closing actuator device 48 which exerts a force on the door to close it, as will be described shortly.

When the time period established by timer 26 elapses, the relay driver ceases driving relay 30, which interrupts power to the motor, and triggers a feedback circuit 38. The feedback circuit provides a signal back to the J-K flip-flop 16 to reset it. This causes inverter 22 to supply a signal to a second trigger generator 40 which activates another timer 42, relay driver 44 and relay 46, which perform functions corresponding to those of components 24–30 described above. This drives the reversible motor in the opposite direction to return the motor and, accordingly, the force exerting door closing device back to their initial positions.

As will be described in more detail shortly, door closing apparatus in accordance to the invention enables an occupant of an associated room to automatically and selectively cause the door to be closed from a remote location in room. The remote control device enables the occupant to remotely and automatically close the door without getting up from a desk or otherwise physically walking over to the door to close it. This is advantageous, for example, to ensure privacy for conversations within the room, or merely to shield noise from the outside which could interfere with telephone conversations or the like. After the door has been closed, the apparatus returns the force exerting device to its initial position. Thereafter, the apparatus is ready to be used again as needed to close the door. The apparatus does not open the door, but only closes it.

Prior to describing in more detail the control circuit and the design of the door closing apparatus in accordance with the invention as illustrated in FIG. 1, certain physical aspects and the operation will first be described. This will be done with reference to FIGS. 3–6.

Figure 3:
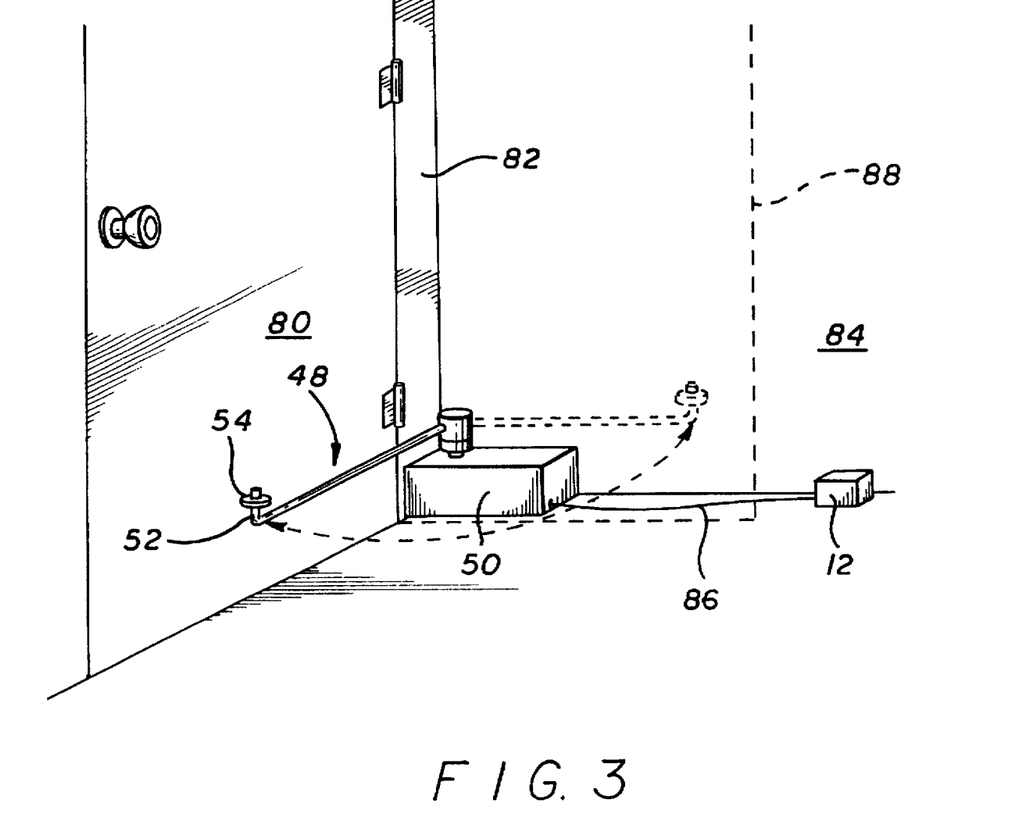
FIG. 3 is a perspective view illustrating the operation of door closing apparatus in accordance with the invention.
Figure 4:
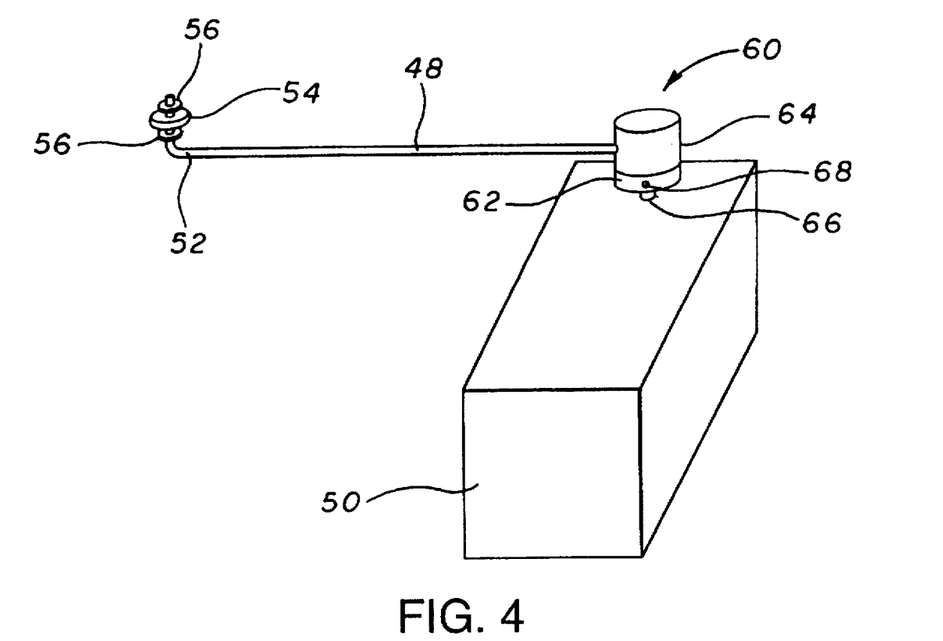
FIGS. 4 and 5 illustrate, respectively, alternative embodiments for connecting a force exerting arm to a drive motor of the door closing apparatus in accordance to the invention.
Figure 6:
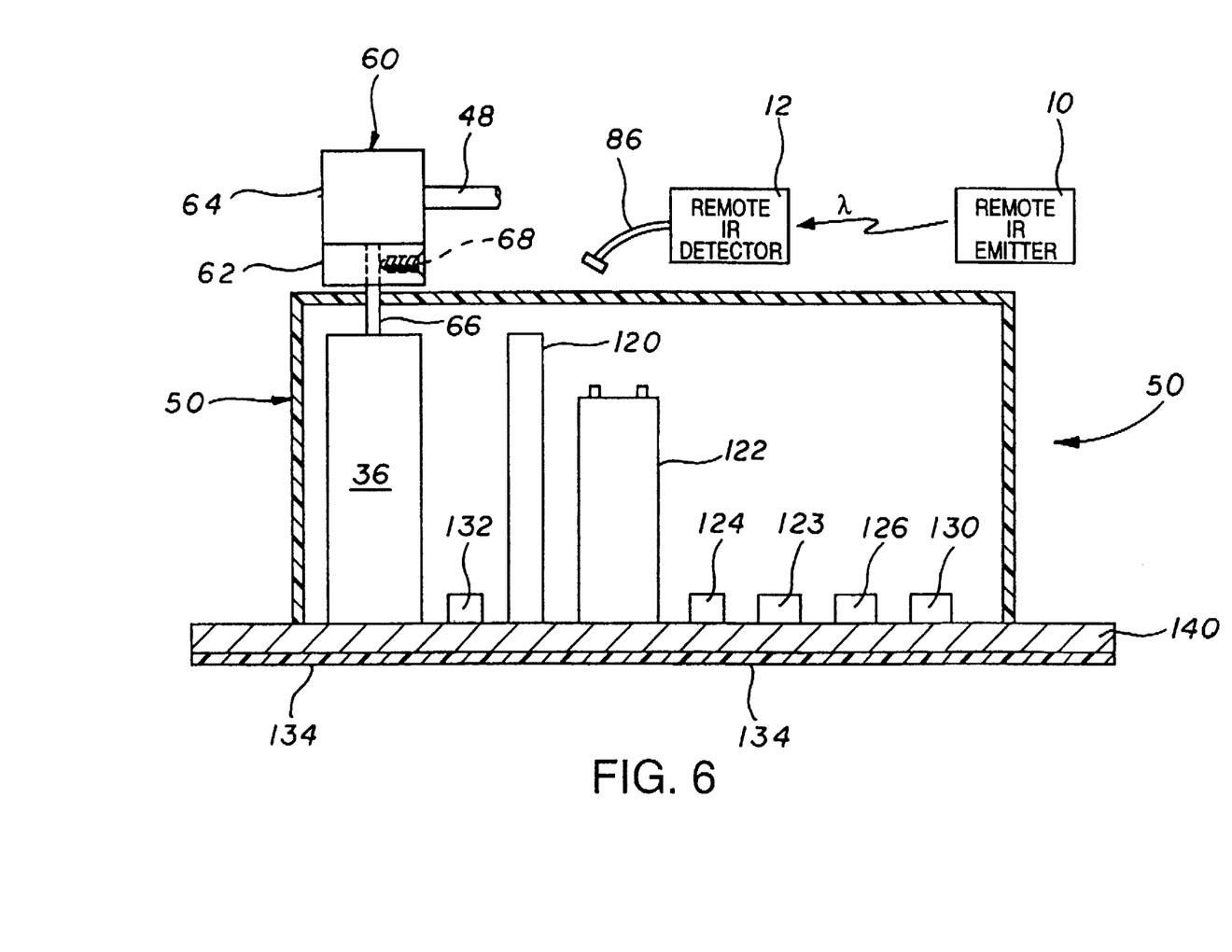
FIG. 6 is a cross sectional view of a preferred form of a housing of the door closing apparatus.

With the exception of the remote control unit 10 and the detector 12, the other components of the door closing apparatus illustrated in FIG. 1 may be enclosed either within or upon a housing 50. As shown in FIG. 3, the housing 50 may take a form of a small substantially rectangularly shaped enclosure (having dimensions of the order of 7 inches long by 3 inches wide, by 3 inches deep, for example). The force exerting device 48 which effects door closing may take the form of a radius arm or rod as shown in FIGS. 3 and 4 which is connected to the motor shaft so that it rotates or swings as the shaft rotates in the manner illustrated in FIG. 3. The rod has its remote end 52 turned upwardly at a right angle, as shown. A small roller or wheel 54 may be rotatably positioned on the remote end of the arm and may be held in place by a pair of washers 56 (see FIG. 4) or other suitable mechanism. The wheel allows the arm to engage the door and move relative to it easily as the door closes. Arm 48 may be connected to the motor shaft by a slip clutch 60, such as a poly clutch slipper. As shown in FIGS. 4 and 6, the poly clutch slipper 60 has a lower portion 62 which may be connected to the motor shaft 66 by means of a set screw 68, and has an upper portion 64 which supports the force exerting rod or arm 48. The poly clutch slipper operates in the following way. Rotation of the motor shaft produces a corresponding rotation of lower portion 62 of the clutch. This rotation is transmitted to the upper portion 64 which rotates arm 48. When a force is applied to the arm in a direction opposite to that in which the motor shaft 66 is turning at a torque or force which is greater than a predetermined force which exceeds the force required to close the door, the poly clutch slips and disengages, thus permitting the arm to turn freely in a direction opposite to that of motor shaft. This prevents damage to the arm and to other components of the apparatus in the event that the door encounters an obstacle upon closing or if someone attempts to enter the door while it is being closed. Once the force in the opposite direction exceeds by that predetermined amount the driving force necessary to close the door exerted by the motor, the clutch slips and allows the arm to be moved in the opposite direction. The poly clutch slipper may be a conventional slip clutch, such as manufactured by Custom Products Corp. model number SA016.

Figure 5:
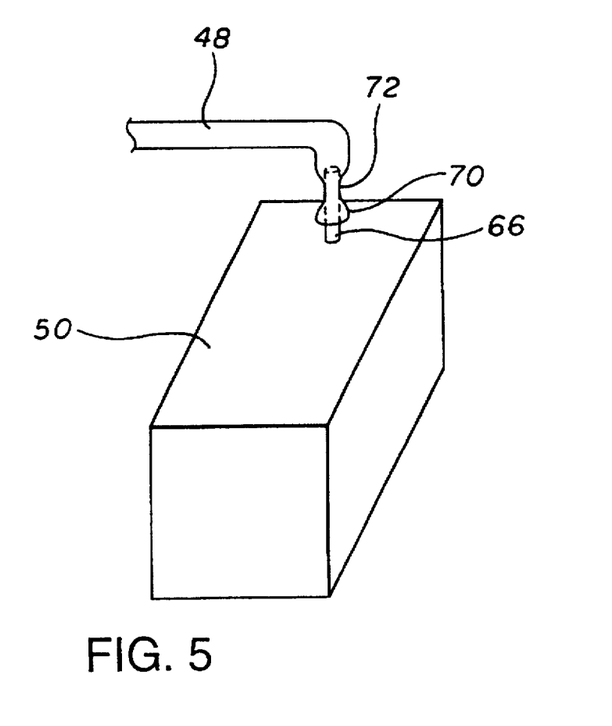

FIG. 5 illustrates an alternative and somewhat simpler manner of attachment of the actuating rod 48 to the motor shaft 66. As shown in FIG. 5, the actuating rod may comprise a tube having an inside diameter sized to accommodate the motor shaft, and having its inboard end 70 bent and crimped as shown at 72 to engage the motor shaft. Crimping the tube to the shaft enables the motor to drive the rod with sufficient force to close the door, yet allows the rod to slip on the shaft if a force in the opposite direction greater than the closing force being applied to the door is encountered. As will be appreciated by those skilled in the art, other types of electrical or mechanical clutches may also be employed to perform the same function. The poly clutch slipper is the preferred design because of cost, size and operation, although the crimp approach illustrated in FIG. 5 provides a lower cost alternative.

Returning to FIG. 3, housing 50 is adapted to be positioned on the floor adjacent to a door 80 which is to be operated and adjacent to walls 82 and 84, as shown. FIG. 3 illustrates the invention being employed with a door which rotates through an angle of 90° between open and closed positions, i.e., wall 84 is at a right angle to the adjacent wall 82 which surrounds the door in its closed position. As will be described shortly, the invention is also applicable to doors which rotate through an angle of 180°. In its initial opened position, illustrated in dotted lines 88 in FIG. 3, arm 48 is located adjacent to and substantially parallel to wall 84 and to the door. With the door in its opened position, housing 50 will be positioned between the open door and the adjacent wall 84. The IR detector 12 is connected to the control circuit within housing 50 by a cable 86, as shown, and is positioned also on the floor so that it extends beyond the edge of the door when opened (indicated in dotted lines as 88 in FIG. 3). In this position IR detector 12 will be available to receive the IR signal from the remote control unit. If, instead, a radio frequency signal is employed, the detector could be included within the housing and be behind the door since line of sight between the detector and transmitter would not be necessary.

As indicated by the dotted arrows in FIG. 3, upon actuation, arm 48 moves from the dotted line position to the solid position as the motor rotates. Wheel 54 engages the surface of the door 80 and pushes the door to the closed position (the solid line position indicated in FIG. 3). Once the door is closed, and the timer 26 times out as earlier described, the motor reverses direction and returns arm 48 back to its initial dotted line positions.

As will be appreciated, the invention is intended to work with doors, which are free swinging and which do not have door stops or other mechanical devices to bias the door toward either opened or closed position.

Figures 2, 2A:
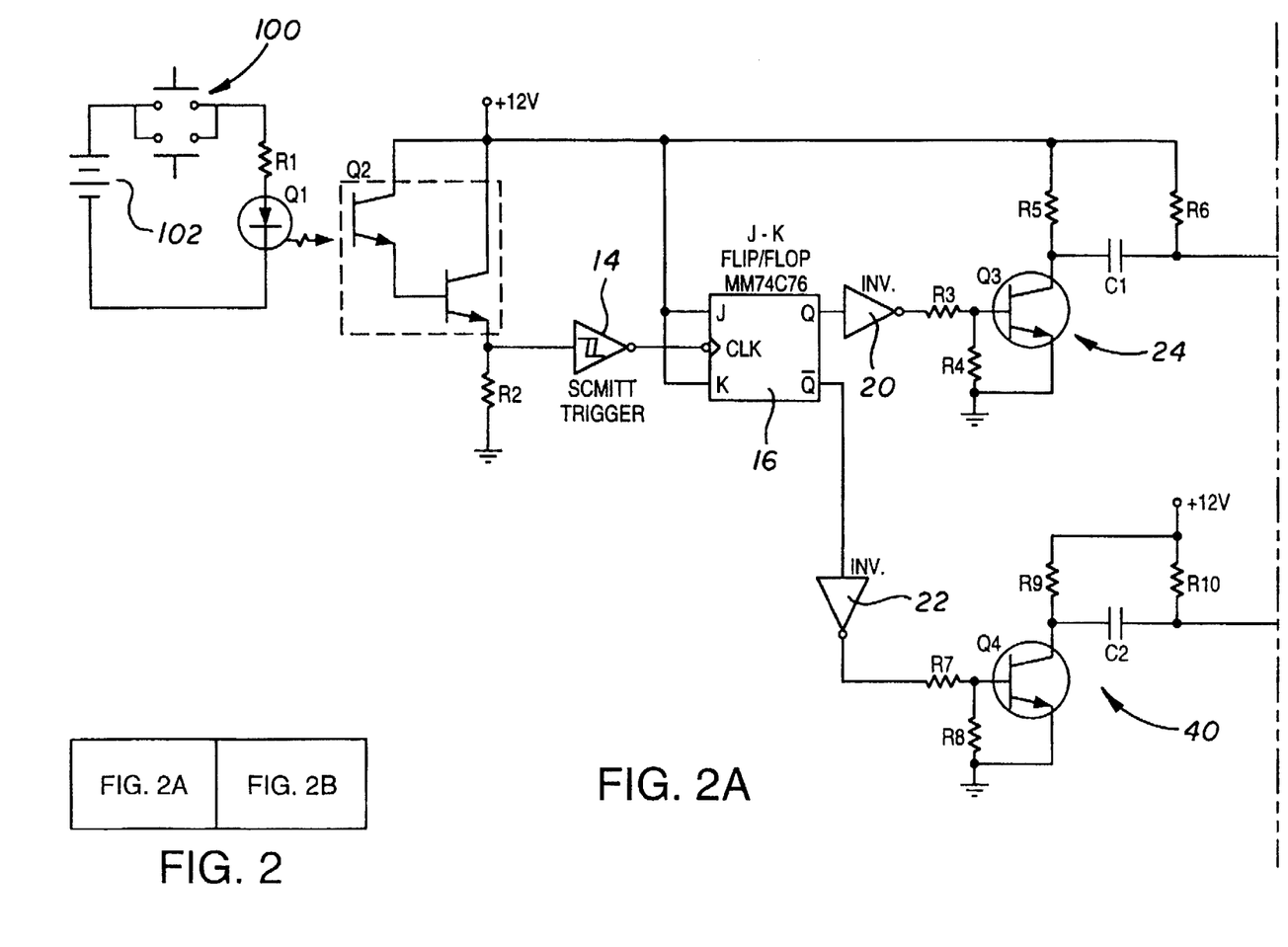
Figure 2B:
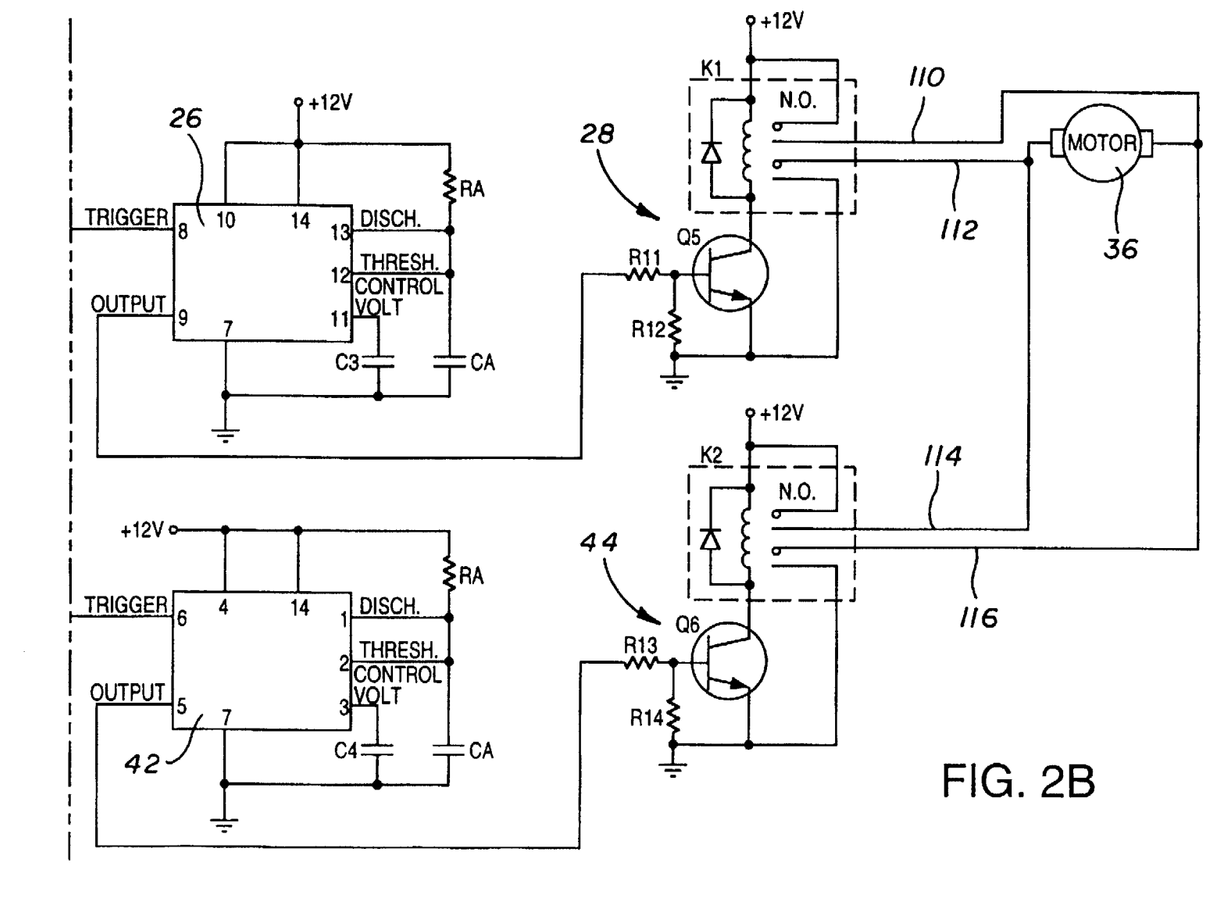

Prior to describing in more detail the construction of the invention as illustrated in FIGS. 2A and 2B, it will first be helpful to describe some of the typical design parameters of the invention.

In order for the invention to effect remote closure of a door, such as illustrated in FIG. 3, the motor and the force exerting arm must be sized appropriately, and the control electronics must be appropriate. Assuming average door dimensions and a solid oak door having a weight of 123 lbs. (546 newtons), the moment of inertia of the door about an axis between the hinges would be of the order of 15.54 kg-meters$^2$. A motor having an output torque of the order of 2.12 newtons-meters (300 oz-in) and an RPM of 1.76, is sufficient to supply the necessary force for closing the door with a radius arm of the order of 18 inches in length. A preferred motor meeting these requirements is a DC motor manufactured by Pittman, model number GM94X2. For doors which require a 90° rotation to close, an RPM of 1.76 requires a closure time of the order of 8.5 seconds. For doors requiring 180° rotation, an RPM of 1.76 requires a closure time of the order 17.1 seconds. These times establish the necessary time intervals for the timers 26 and 42 of FIG. 1.

Referring now to FIGS. 2 A–B, the remote control unit 10 may comprise a momentary acting closure switch 100 for supplying current from a battery 102 to an infra-red (IR) signal generating diode Q1. A resistor R1 may be employed for limiting the current flow. IR detector 12 may comprise a Darlington configuration of dual transistors Q2 which supply current to a resistor R2. The voltage drop across the resistor R2 is supplied as an input to Schmitt trigger 14. The Schmitt trigger sharpens the waveshape, inverts it, and supplies it to the clock input (CLK) of the J-K flip-flop 16, which may be a model number MM74C76. As shown both the J and K inputs of the flip-flop may be tied to the supply voltage, which may be 12 volts. The negative going pulse from the Schmitt trigger supplies the clock pulse for the flip-flop. The flip-flop is set for toggle operation, so on each succeeding negative clock pulse the outputs of the flip-flop will toggle between logic 1 and logic 0 levels. Thus, either the normal (Q) output from the flip-flop or the inverting output $\overline{Q}$ will be a logic 1 or a logic 0, and the outputs will switch between levels on each clock pulse.

Inverters 20 and 22 are connected to the normal and inverted outputs, respectively, of the flip-flop 16. As shown, inverter 20 drives a transistor Q3 through resistors R3 and R4 to cause Q3 to turn on and supply a negative-going pulse through a capacitor C1 to timer 26 (see FIG. 2B). Timer 26 may comprise a monostable device which supplies on its output a positive pulse for a predetermined time interval corresponding to that necessary to move the door from its open position to its closed position. As earlier explained, this pulse may be approximately 9 seconds for a 90° rotation or approximately 18 seconds for a 180° rotation. The time interval of timer 26 is established by the R-C circuit comprising resistor RA and capacitor CA. The positive output pulse from the timer turns on transistor Q5 of relay driver 28 to operate relay K1, causing the normally open (NO) contacts 110, 112 to close, and applying voltage to motor 36. As explained previously, when K1 is actuated and current is supplied to the motor, the motor rotates arm 48, to engage and exert a force through the small wheel 54 on the door to close it. Once the door is closed, and timer 26 times out, flip-flop 16 is reset and the motor reverses direction to return to its original position. This is accomplished by inverter 22, which supplies a trigger pulse to transistor Q4, which in turn triggers timer 42. The timer may also comprise a monostable device similar to timer 26. The output of timer 42 turns on transistor Q6 of relay driver 44 to close normally open (NO) contacts 114 and 116 of relay K2, which reverses the current to motor 36 and causes the motor to rotate in the opposite direction. This returns the motor and the arm 48 back to their initial positions adjacent to the opened position of the door.

As illustrated in FIGS. 2 A and B, the control circuit as well as the relays may operate from a supply of 12 volts DC, although any other convenient voltage may be employed. The apparatus may be either battery operated, or AC powered, in which case the same circuit may be employed with a DC power supply to supply the operating voltage.

FIG. 6 illustrates a possible arrangement of components within housing 50. These components may comprise, for example, a circuit board 120 for the control circuit of FIGS. 2 A–B, a battery 122, a transformer 123, a rectifier 124 for converting AC from transformer 122 to unidirectional DC, an AC power connector 126 and an on/off switch 130. Additionally, a connector 132 may be provided for connecting cable 86 of remote IR detector 12 to the electronics circuit board 120.

A significant aspect of the invention is that housing 50 includes a means for immobilizing and stabilizing the housing on a floor in a non-permanent, connection comprising means for releasably engaging or attaching the housing to the floor so that it may be easily relocated. In the form illustrated in FIG. 6, this may comprise a layer 134 of adhesive, such as double-sided carpet tape, for example, which is applied to the base 140 of the housing. One side of the tape is affixed to the bottom of the housing, and the other side sticks to the floor. This stabilizes and immobilizes the housing on the floor at a selected location adjacent to the door in its opened position to prevent slipping during operation of the apparatus, yet is releasable so that the housing may be lifted and easily moved. This approach for immobilizing the housing is suitable for both carpeted floors and smooth floors. Alternatively, the releasable engaging layer 134 could be of anti-slip material, such as a layer of rubber or suction cups affixed to the base of the housing. This approach is preferable for smooth floors. For carpeted floors, the base may be provided with prongs or carpet tacks which penetrate into the pile of the carpet to stabilize the housing on the floor. Other ways of releasably engaging the floor to immobilize and stabilize the housing can also be used depending upon the type of floor upon which the housing is to be placed. Significantly, however, the housing is not permanently connected to or integral with the floor. Rather, it is free-standing and releasably attached, and is merely immobilized and stabilized in its location so it does not slip. Thus, the housing may be easily disengaged and moved to a different location. This is a significant advantage since it requires no permanent attachment to either the floor, the wall, or the door and no modification of such structures. This portability makes the invention particularly advantageous for use in offices and other situations where permanent attachment or other modification of the door or surrounding structure is undesirable.

While the foregoing has been with respect to preferred embodiments of the invention, it will be appreciated by those skilled in the art that changes in these embodiments may be made without departing of the principles and the spirit of the invention, the scope of which is defined in the appended claims.

What is claimed is:

1. A portable apparatus which closes a door, said apparatus comprising:
    (a) force exerting means in an initial position freely spaced from the door which in a second position engages a surface of the door in a closing motion to move the door from an opened position to a closed position;
    (b) control means responsive to a remote actuation signal for controlling the force exerting means engagement with the door in a closing motion;
    (c) a portable housing which houses the control means and the force exerting means in a free standing position on a floor juxtaposed to a wall adjacent to the opened position of the door such that upon operation of the force exerting means to move the door to the closed position the housing is prevented from moving relative to said position.

2. The portable apparatus of claim 1 which further comprises immobilizing means which portably immobilizes the housing in said free-standing position.

3. The portable apparatus of claim 2 wherein said immobilizing means comprises frictional engaging means which prevent the housing from slipping during operation of the apparatus.

4. The portable apparatus of claim 4 wherein said immobilizing means comprises an adhesive material.

5. The portable apparatus of claim 3 wherein said immobilizing means comprises anti-skid material.

6. The portable apparatus of claim 3 wherein said immobilizing means comprises carpet engaging means.

7. The portable apparatus of claim 2 wherein the force exerting means comprises a motor and an arm connected to the motor which arm engages the door in a closing motion upon rotation of the motor to move the door from the opened position to the closed position.

8. The portable apparatus of claim 7 wherein said arm carries a roller on an end thereof for engaging the door, the roller rolling against the door as the arm engages the door in a closing motion moving the door to the closed position.

9. The portable apparatus of claim 8 wherein the arm is connected to the motor through a clutch which slips when a reverse force greater than a predetermined amount of torque is applied to the arm.

10. The portable apparatus of claim 8 wherein the arm comprises tubing which is crimped onto a drive shaft of the motor so as to enable slippage upon a reverse force exceeding a predetermined amount of torque being exerted on the arm.

11. The portable apparatus of claim 1 wherein said control means comprises a timer for operating the force exerting means for a first predetermined period of time sufficient to move the door from the opened position to the closed position.

12. The portable apparatus of claim 11 wherein said control means further comprises returning means responsive to the door reaching the closed position for returning the force exerting means to said initial position adjacent to the opened position of the door.

13. The portable apparatus of claim 12 wherein the returning means comprises means for reversing the direction of the force exerting means for a second predetermined period of time.

14. The portable apparatus of claim 13 further comprising a second timer which is actuated upon the door reaching the closed position for reversing the direction of the force exerting means for said second predetermined period of time.

15. The portable apparatus of claim 14 wherein the force exerting means comprises an actuator and an arm connected to the actuator for engaging the door, and the control means comprises a latch responsive to said actuation signal for causing operation of the actuator for said first predetermined period of time to move the door to the closed position, and for operating the returning means for said predetermined period of time to return the actuator to the initial position.

16. The portable apparatus of claim 1 wherein the control means includes means for receiving said actuation signal from a wireless remote signal emitter for operating the force exerting means.

17. A portable apparatus which closes a door, said apparatus comprising
    (a) force exerting means in an initial position freely spaced from the door which in a second position engages a surface of the door to move the door from an opened position to a closed position;
    (b) actuator means coupled to the force exerting means which causes the force exerting means to move the door to the closed position; and
    (c) frictional engaging means associated with the actuator means for stabilizing the actuator means in a portable, free-standing position on a floor adjacent to the opened position of the door during operation of the actuator means.

18. The apparatus of claim 17 wherein said frictional engaging means comprises adhesive material which non-slidingly engages the actuator means to the floor.

19. The apparatus of claim 17 wherein the actuator means comprises a rotatable shaft, and a clutch connected to the shaft and to the force exerting means, the clutch enabling the force exerting means to slip relative to the rotating shaft upon a reverse force exceeding a predetermined value of torque being applied to the force exerting means.

* * * * *